United States Patent
Arréhn et al.

(10) Patent No.: US 9,152,309 B1
(45) Date of Patent: Oct. 6, 2015

(54) TOUCH SCREEN LOCKING AND UNLOCKING

(75) Inventors: Tobias Arréhn, Malmo (SE); Martin Chakirov, Trelleborg (SE)

(73) Assignee: Google Inc., Mountain View, CA (US)

( * ) Notice: Subject to any disclaimer, the term of this patent is extended or adjusted under 35 U.S.C. 154(b) by 1128 days.

(21) Appl. No.: 12/058,166

(22) Filed: Mar. 28, 2008

(51) Int. Cl.
*G06F 3/0484* (2013.01)
*G06F 3/0488* (2013.01)

(52) U.S. Cl.
CPC ........ *G06F 3/04845* (2013.01); *G06F 3/04886* (2013.01)

(58) Field of Classification Search
CPC G06F 3/04845; G06F 3/0487; G06F 3/04886
USPC ......... 715/771–773, 744–747, 864, 833, 831, 715/863, 843, 790, 795, 741–743
See application file for complete search history.

(56) References Cited

U.S. PATENT DOCUMENTS

| | | | |
|---|---|---|---|
| 7,412,258 B1* | 8/2008 | Lipponen et al. | 455/556.1 |
| 7,657,849 B2* | 2/2010 | Chaudhri et al. | 715/863 |
| 7,940,250 B2* | 5/2011 | Forstall | 345/173 |
| 2002/0032043 A1* | 3/2002 | Ishikawa | 455/566 |
| 2002/0091659 A1* | 7/2002 | Beaulieu et al. | 706/62 |
| 2005/0079896 A1 | 4/2005 | Kokko et al. | |
| 2005/0085215 A1 | 4/2005 | Kokko et al. | |
| 2006/0125814 A1* | 6/2006 | Asai et al. | 345/204 |
| 2007/0275752 A1* | 11/2007 | Noba | 455/550.1 |
| 2007/0288868 A1* | 12/2007 | Rhee et al. | 715/840 |
| 2008/0070505 A1* | 3/2008 | Faltman | 455/41.3 |
| 2008/0122796 A1* | 5/2008 | Jobs et al. | 345/173 |
| 2008/0161058 A1* | 7/2008 | Park et al. | 455/564 |
| 2008/0167022 A1* | 7/2008 | Lee et al. | 455/415 |
| 2008/0168395 A1* | 7/2008 | Ording et al. | 715/833 |
| 2008/0189293 A1* | 8/2008 | Strandel et al. | 707/10 |
| 2008/0194276 A1* | 8/2008 | Lin et al. | 455/466 |
| 2008/0195976 A1* | 8/2008 | Cho et al. | 715/840 |
| 2008/0292078 A1* | 11/2008 | Chen | 379/142.06 |
| 2009/0005011 A1* | 1/2009 | Christie et al. | 455/412.2 |
| 2009/0106679 A1* | 4/2009 | Anzures et al. | 715/765 |
| 2009/0170487 A1* | 7/2009 | Ding | 455/415 |
| 2009/0174677 A1* | 7/2009 | Gehani et al. | 345/173 |
| 2009/0177981 A1* | 7/2009 | Christie et al. | 715/758 |
| 2009/0207184 A1* | 8/2009 | Laine et al. | 345/619 |
| 2009/0265627 A1* | 10/2009 | Kim et al. | 715/702 |
| 2010/0121766 A1* | 5/2010 | Sugaya et al. | 705/50 |

* cited by examiner

*Primary Examiner* — Steven Sax
(74) *Attorney, Agent, or Firm* — Fish & Richardson P.C.

(57) ABSTRACT

A computer-implemented touch screen call interface includes announcing an incoming telephone call on a mobile device touch screen display, connecting to the call and displaying a slidable panel on the display while locking the display from inputs other than unlocking inputs, receiving a user selection moving the slidable panel away from a position that covers one or more selectable controls, and unlocking the display for selection of the selectable controls while the slidable panel stays in a position that leaves the selectable controls uncovered.

15 Claims, 11 Drawing Sheets

TOUCH SCREEN LOCKING AND UNLOCKING

TECHNICAL FIELD

This document relates to systems and techniques for generating graphical display elements and controls for mobile devices.

BACKGROUND

People spends hours at a time with their electronic devices—computers, telephones, music players, and the like. They like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, four-directional keypads, and other such input mechanisms.

Fine distinctions in user interfaces can make a world of difference in a user's experience with a device. User interface options may be reduced for mobile devices, where full-sized keyboards or no keyboards at all are available. In such situations, intuitive interaction may be at a premium. The importance of such interaction may be even more pronounced with mobile devices, where the user needs to interact with a device using a single hand.

SUMMARY

This document describes systems and techniques that may be used to interact with a user of a computing device, like a mobile telephone having a touch screen user interface. In general, the techniques may provide for the display of a mechanism to lock a touch screen input for a device, where the mechanism uses a visual representation of a sliding cover that obscures selectable controls on the display and thus makes them unselectable. In this manner, the cover locks the interface from receiving data entry. The user may unlock the display by dragging the cover off of the selectable controls. In one example, the cover is generated on the display upon the receipt of an incoming call or the dialing of an outgoing call, so that a user does not accidentally select an object on the display when they hold the device against the side of their head. The user may move the cover back and forth during a call to alternatively block and unblock data entry to the touch screen display.

In certain implementations, such systems and technique may provide one or more advantages. For example, a user may more readily use their device without accidentally providing touch input to the device. Such a feature may be presented in an intuitive manner to the user so that they can readily see what is needed from them to lock or unlock the device, without the need for training. In addition, the user may readily access selectable controls when they need such access, simply by moving the cover out of the way.

In one implementation, a computer-implemented touch screen call interface method is disclosed. The method comprises announcing an incoming telephone call on a mobile device touch screen display, connecting to the call and displaying a slidable panel on the display while locking the display from inputs other than unlocking inputs, receiving a user selection moving the slidable panel away from a position that covers one or more selectable controls, and unlocking the display for selection of the selectable controls while the slidable panel stays in a position that leaves the selectable controls uncovered. The method can also comprise displaying information about the telephone call on the slidable panel. In addition, the method can further comprise receiving a user selection dragging the slidable panel over the selectable controls and locking the display form inputs other than unlocking inputs in response to the user selection.

In another implementation, a computer-implemented user interface method is disclosed. The method comprises displaying on a touch screen display a visual representation of a movable panel and locking the display to inputs other than inputs that move the panel, receiving a user command to slide the panel and to reveal selectable controls previously hidden by the panel, and unlocking the touch screen display to data entry via the revealed selectable controls. The representation of a movable panel can comprise a rectangular, solid cover over the selectable controls. The user command can comprise an on-screen dragging motion on top of the panel. Also, the movable panel can substantially fill the display in a first dimension and the dragging motion can occur in second dimension that is orthogonal to the first dimension. The method can also comprise announcing an incoming telephone call on the display and connecting to the incoming call only after receiving a user input sliding the movable panel. In addition, locking the display can occur substantially concurrent with answering the call.

In some aspects, the selectable controls comprise controls for controlling a telephone call whose information is displayed on the movable panel. In addition, the method can include sensing an end of call event and removing the slidable panel from the display in response to the end of call event.

In yet another implementation, an article comprising a computer-readable data storage medium storing program code operable to cause one or more machines to perform operations is disclosed. The operations comprise displaying on a touch screen display a visual representation of a movable panel and locking the display to inputs other than inputs that move the panel, receiving a user command to slide the panel and to reveal selectable controls previously hidden by the panel, and unlocking the touch screen display to data entry via the revealed selectable controls. The user command can comprise an on-screen dragging motion on top of the panel. Also, the medium can further store program code operable to cause the one or more machines to announce an incoming telephone call on the display and connect to the incoming call only after receiving a user input sliding the movable panel. Moreover, the the selectable controls can comprise controls for controlling a telephone call whose information is displayed on the movable panel.

In another implementation, a computer-implemented user interface system for use on a mobile communication device is disclosed that comprises a graphical user interface module to display user selectable elements, including a movable panel to block visual display of selectable controls, a touch screen user input mechanism to receive user selections in coordination with the display of user selectable elements, including user selections to slide the movable panel, and a display access manager to block inputs to controls other than the movable panel when the movable panel is in a position that blocks the selectable elements.

In some aspects, the display access manager is programmed to cause a display of the movable panel during a telephone call on the mobile device. The system can also comprise a contacts module to provide data for displaying information about a caller on the movable panel. Also, a user selection on the movable panel followed by a sliding selection can causes the movable panel to move in a direction of the sliding selection and to block the inputs if the sliding selection is indicative of a user intent to slide the movable panel over the controls.

In another implementation, a computer-implemented user interface system is disclosed that comprises a graphical user interface module to display user selectable elements, a touch screen user input mechanism to receive user selections in coordination with the display of user selectable elements, and means for blocking or unblocking user access to selectable elements in response to user selections of one or more elements that block display of the selectable elements.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques that may be presented to a user of a mobile device to prevent certain forms of data entry by the user on the device. In particular, there may be times during which it s advisable to block data entry to a device, such as when a user has a touch screen device against their face when taking a telephone call. As such, the selection of controls on the touch screen may be disabled, such as by providing a graphically-generated shield over such controls. The shield may be generated to look like a physical cover that slides over the controls, and a user may manipulate the cover by pressing on top of the cover on the touch screen display and dragging their finger across the display to slide the cover. Such sliding manipulation used to unlock the touch screen may be the only input permitted by the system.

Moving of the cover may cause a number of selectable controls to be uncovered. For example, controls relating to the call may be shown, such as controls for conferencing in other callers, controls for showing additional contacts of the user, controls for muting the phone or powering a speakerphone, and other such controls. The locking and unlocking of the display may alternatively, or additionally, be controlled by selectable buttons or other devices that are not on the touch screen itself.

Figure 1:
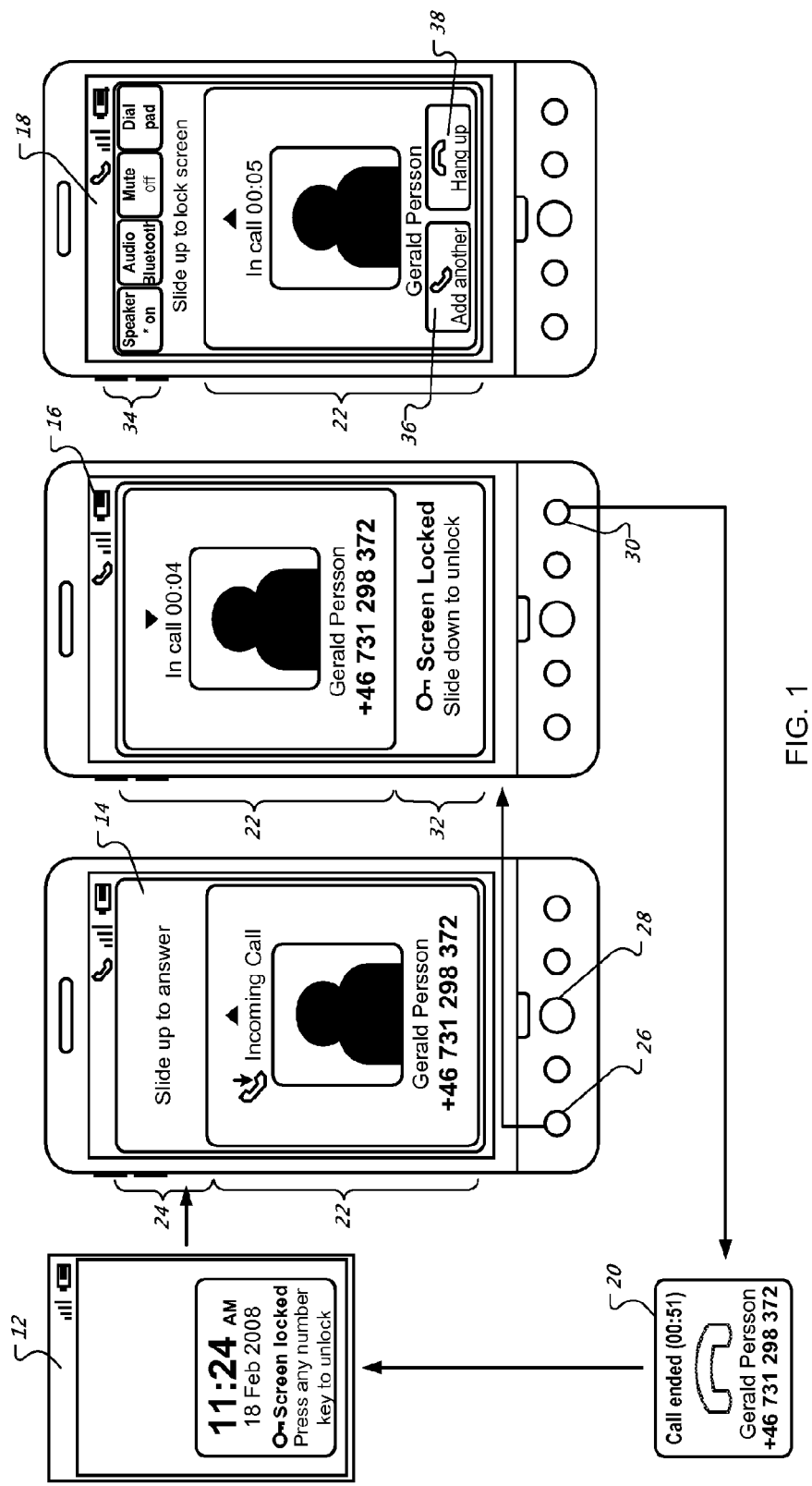
FIG. 1 shows several displays by a mobile device that provides for screen locking.

FIG. 1 shows several displays 12-20 by a mobile device that provides for screen locking. In a first display 12, the device itself is locked, perhaps because the user has not interacted with the device for an extended period of time. Such a locking of a device after a period of inactivity is commonly known. In this example, only minimal information is provided on the locked display 12, including date and time, and a message that the screen is locked. In this particular example, there is no password or other similar protection on the device, and the screen has simply been locked to prevent accidental input, and has been blackened to save power.

A selection of a hardware key may be used to wake the device from this locked, or sleep mode, as shown by the arrow connecting display 12 to display 14. For example, hardware buttons such as button 26 or clickable scroll wheel 28 may be provided on the devices and may be less susceptible to accidental selection than is the screen itself, so that such elements may be provided with the ability to wake the device. Such buttons may be used to unlock the touch screen display, which is more susceptible to accidental activation.

Display 14 shows the presence of an incoming call, where an alert indicating that the call was occurring may have caused the transition from display 12 to display 14, either alone or in combination with some action of the user, such as a user selection of a hardware button or a motion of the device (e.g., as sensed by an on-board accelerometer). The display 14 shows a panel 22 which, in this example, is a rectangular, solid graphical element capable of being moved when a user presses their finger to the display 14 and drags it upward or downward. The panel 22 may also take geometric forms other than a rectangle, and may be partially transparent, perforated, or generated in other such manners.

The panel 22 fills the width of the display 14 but does not fill the height of the display 14, and thus the user can readily see that the panel can be slid upward but not sideways. The display 14 also provides a user with the instruction "slide up to answer," so as to indicate to the user that they should place a finder or fingers on the panel 22 and slide upward. The panel 22 may also be slid upward by fast spinning of trackball 28 in an upward direction. Alternatively, the user may press hardware key 26 to answer the call. Selection of other hardware keys or on-screen controls (not shown), or sliding of the panel 22 in other directions, may result in the device being silenced and the call being sent to voice mail or being provided a busy tone if voice mail is not enabled.

The panel 22 may be given physics attributes so that a user need not drag the panel 22 if the user initially pushes the panel 22 hard enough that the momentum of the panel 22 will carry it to the end of the display 14. Also, the panel may be dragged from off the edge of the display 14 in certain situations, much like pulling a roll-shade over the surface of the display 14.

Display 16 shows the device after the panel 22 has been slid upward until it locks into position at the top of the display 14. Such motion has covered the instruction area 24 with the panel 22. In addition, sliding the panel 22 upward may cause the user to pick up the telephone call, i.e., to complete the telephone connection (which may simply be a logical connection, such as where the communication uses packet-based data transfers). In this situation, the screen has been locked so that no input other than sliding of the panel 22 back to its original position may be received by the device. As a result, a user may press the device to the side of their face to talk on the device, without worrying that any control on the touch screen will be inadvertently selected. In addition, a message zone 32 that has been uncovered by the sliding of the panel 22 indicates to the user that the screen is currently locked to input, and that the user should slide the panel 22 downward to unlock the device.

Even with the display 14 locked, the hardware buttons may still be operational in certain implementations. For example, button 30, when selected while a call is ongoing, may cause the device to hang up the call, as shown by display 20. In that display, summary information for the call such as the identity of the other caller and the elapsed time for the call, may be shown on the display screen. After a moment of time, however, the device falls back to display 12.

Separately, if the user slides the panel 22 back down before ending a call, such movement may reveal selectable on screen controls 34 in a display 18. The controls 34 may take a variety of forms. In the pictured example, the controls 34 include context sensitive controls that are associated with the ongoing telephone call. In particular, one control turns the speaker phone on or off, another mutes or un-mutes the device, another raises the dialing pad such as to permit a user to conference in another person, and a fourth transfer the audio for the call to a Bluetooth device such as a wireless headset. Other controls (now shown) may also be provided. For example, general controls for launching other application may be shown, such as a selection to launch a messaging application. Using such a control, the user may begin reviewing e-mails and other such messages while the telephone call is ongoing (e.g., if the call is a conference call that does not require the user's full attention).

In addition, the display 18 shows additional controls 36, 38 on the panel 22 for controlling the call. An add control 36 may be selected by the user to add another caller, such as to form a conference call. Selection of control 36 may result in a list of contacts being displayed on the device, so that the user may select one of those contacts, such as a colleague that the user has in common with the caller—Gerald Persson in this example. A hang up control 38, when selected, causes the call to be terminated in a familiar manner.

In addition, when the panel 22 is slid down to reveal the controls 34, a message is provided below the controls 34 instructing the user how to lock the display 18 again. Other appropriate messages and controls may also be displayed to a user of the device in appropriate locations.

Selections by a user other than those discussed here may also be required in order to unlock a touch screen display, and a user may be given the opportunity to choose between multiple options. For example, a particular user may, for whatever reason, often sweep down across his or her display and may thus be prone to accidentally unlocking a device like that discussed above. Such a user may choose instead to use a motion that would be less likely to be provided accidentally, such as a side-to-side sweep or even a multi-directional motion. For example, the user may choose to trace a letter such as a "z" across the panel in order to have the panel slide out of the way of covering selectable controls on the device. Likewise, different patterns may be generated on the panel by the device itself, and the user may be required to trace the current pattern in order to unlock the display for input.

Other such control techniques may also be used to unlock a mobile device display. For example, selectable controls may be provided visually beneath the pieces of a sliding puzzle, like the physical puzzles that contain square covers arranged in a two-dimensional grid, with one spot in the grid empty. Such games may commonly require the use to slide the covers until they form a complete picture. On the device shown here, the sliding of such covers may result in the display of selectable controls underneath the covers. Alternatively, a plurality of graphical covers may be provided in a row next to each other, where each cover lies on top of a single selectable control. Answering of a call may result in all of the covers sliding into position over a control, whereas each cover may then be individually slid out of position so that only its corresponding control is unlocked. Also, the covers may be slightly transparent so that the particular controls may be seen below the cover, but in a manner that makes plain to the user that the controls are covered up and thus not selectable at the moment.

In sum, such a graphical arrangement for the display of call information may provide a very intuitive approach for a typical user of a mobile device. The user may readily see that they need to slide the panel 22 in one direction to answer a call, and may also readily understand that the panel—lacking in input controls—is blocking accidental pressing of elements on the touch screen display. At the same time, the user may readily move the panel to permit additional interaction with the device, by visually sliding the panel out of the way of blocking the selectable controls.

Figure 2:
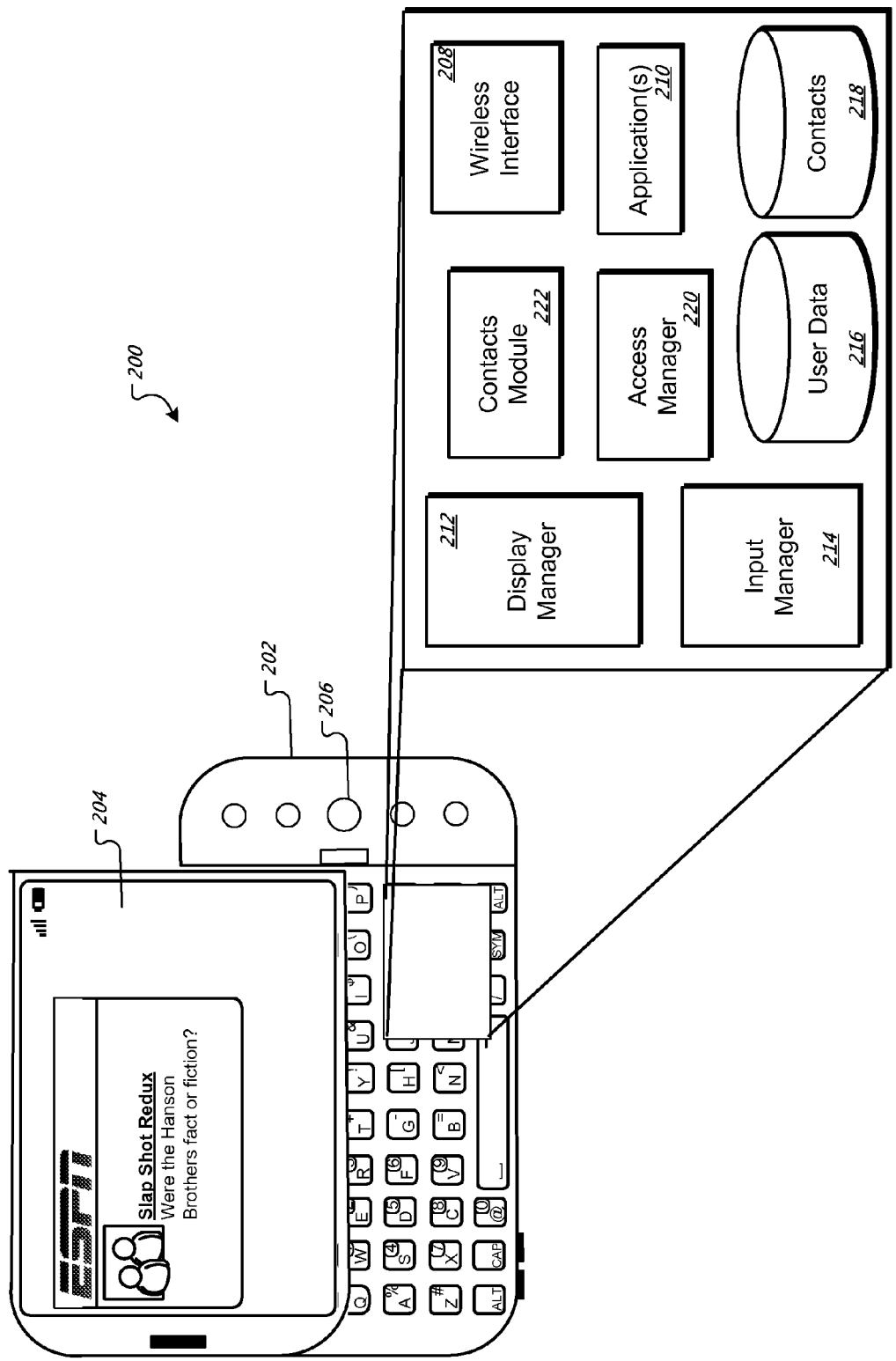
FIG. 2 is a schematic diagram of a system that provides user interaction in response to touch screen inputs.

FIG. 2 is a schematic diagram of a system 200 that provides user interaction in response to touch screen inputs. In general, the system 200 may include components, such as software stored on magnetic, optical, or other media, and operating on one or more processors in a mobile device 202. Such a device 202 in this example, is shown to have a touch screen display 204 for displaying graphics as part of a graphical user interface, and for receiving input from a user of the device 202. In addition, the device 202 has a number of hardware buttons, including a clickable scrolling ball 206, that can be programmed to receive other user input including input that is coordinated with what is shown on display 204.

A number of components stored on, and operating on, device 202 are shown schematically here and may provide for functionality to lock and unlock the touch screen display 204 from receiving input. For example, the display 204 may be controlled by a display manager 212 that manages various visual elements that are to be shown to a user on the display 204, while an input manager 214 manages inputs received from the display 204 or from other mechanisms such as trackball 206.

The display manager 212 may receive graphic-related content from a number of sources and may determine how the content is to be provided to a user. For example, a number of different windows for various applications 210 on the device 202 may need to be displayed, and the display manager 212 may determine which to display, which to hide, and what to display or hide when there is overlap between various graphical objects. The display manager 212 may be implemented, for example, by software operating on a microprocessor on device 202 and/or on a dedicated graphics processor with associated software and firmware.

The input manager 214 may be responsible for translating commands provided by a user of device 202. For example, such commands may come from a keyboard, from touch screen display 204, from trackball 206, or from other such sources, including dedicated hardware buttons or soft buttons (e.g., buttons whose functions may change over time, and whose functions may be displayed on areas of display 204 that are adjacent to the particular buttons). The input manager 214 may determine, for example, in what area of the display the commands are being received, and thus the application being shown on the display for which the commands are intended. In addition, it may interpret input motions on the touch screen 204 into a common format and pass those interpreted motions (e.g., short press, long press, multiple press, straight-line drags, and multi-touch inputs) to the appropriate application. The input manager 214 may also report such inputs to an event manager (not shown) that in turn reports them to the appropriate modules or applications. As one example, the input manager 214 may report the location of a dragging motion on the display 204, so that another application (such as access manager 220) may determine whether the dragging occurred on top of a panel that is to be used to lock the display 204 from further input.

A variety of applications 210 may operate, generally on a common microprocessor, on the device 202. The applications 210 may take a variety of forms, such as mapping applications, e-mail and other messaging applications, web browser applications, and various applications running within a web browser or running extensions of a web browser. One particular application may be a telephony application that managers telephone calls on the device 202. The telephony application may take a variety of familiar forms and may provide a number of features, including caller ID, teleconferencing, auto-dialing, voice mail handling, call forwarding, and the like, either on the device 202 or also in combination with a hosted service.

An access manager 220 interoperates with the applications 210, including with the telephony application, to control access to the device 202, including by controlling the ability to enter commands on the touch screen display 204. The access manager may, for example, generate an image of a movable cover or multiple covers that can be positioned by a user (e.g., by touching the cover and moving it into or out of position) to be placed over an area in which selectable controls would otherwise be displayed. The access manager may also be passed contact information about a caller, and may display such information on top of the cover, or may display other such information on the cover. In addition, the access manager 220 may communicate with the input manager 214 to determine when a user is indicating an intent to move the cover, such as by placing a finger on the cover on the display 204, and dragging the finger. The access manager 220 may then communicate back to the input manager 214 when such motion has occurred so as to lock or unlock other applications from receiving input from the display 204—so that movement of the cover in a particular manner may be the only input permitted on the then-locked display 204.

A user data database 216 may store a variety of information that is specific to a user of the device 202. For example, a particular action that a user is to take to lock or unlock the display 204 may be stored in the database 216. Likewise, personal contact information about the user and profile information describing the user's interests may also be stored. Such information may be accessed by the access manager 220 and/or the applications 210 to provide a more specialized experience for a user of device 202.

The telephony application may also provide information about users on the other end of a call by referring to contacts module 222 and contacts database 218. Contacts database 218 may, in a standard manner, contain information about users with which the user of device 202 has an acquaintance relationship, such as friends or co-workers. The contacts module 222 may be called by various applications to obtain and return information from the contacts database 218. For example, when an incoming call is received, a telephony application may pass telephone number information received with the incoming call (e.g., ANI information) to the contacts module, which may conduct a query on the number information in the contacts database, so as to determine whether the caller is an acquaintance of the user of the device 202. If a match is found, the name of the acquaintance having that particular telephone number may be provided to the telephony application, as may a digital image of the acquaintance. Such information may then be displayed to a user of the device so they can readily see who is calling them, and may decide quickly whether to take the call or not.

A wireless interface 208 managers communication with a wireless network, which may be a data network that also carries voice communications. The wireless interface 208 may operate in a familiar manner, such as according to the examples discussed above and below, and may provide for communication by the device 202 with messaging service such as text messaging, e-mail, and telephone voice mail messaging. In addition, the wireless interface 208 may support downloads and uploads of content and computer code over a wireless network. As described more fully here, the wireless interface 208 may provide for voice communications in a wireless network in a familiar manner.

Using the pictured components, and others that are omitted here for clarity, the device 202 may provide for user interactions while preventing the display 204 from receiving accidental or unwanted inputs. In particular, when a call arrives through the wireless interface, a telephony application may cause the call to be announced to the user. The access manager 220 may be used to announce the call, and may present the incoming call along with a selectable control whose selection by a user of device 202 causes the call to be answered and the display 204 to be locked from further input (other than an unlocking input). The call may then continue and the access manager 220 may prevent other applications from being accessed by the user and/or from announcing to the user as long as the device remains locked. The access manager 220 may also be provided with an indication, e.g., from he input manager 214, that the user has made an unlocking selection such as by moving a cover away from selectable controls on the display that the cover (which is a graphically generated cover on the display 204) had previously rested on top of. The user may then select such controls, such as to affect the operation of the telephony application.

Figure 3A:
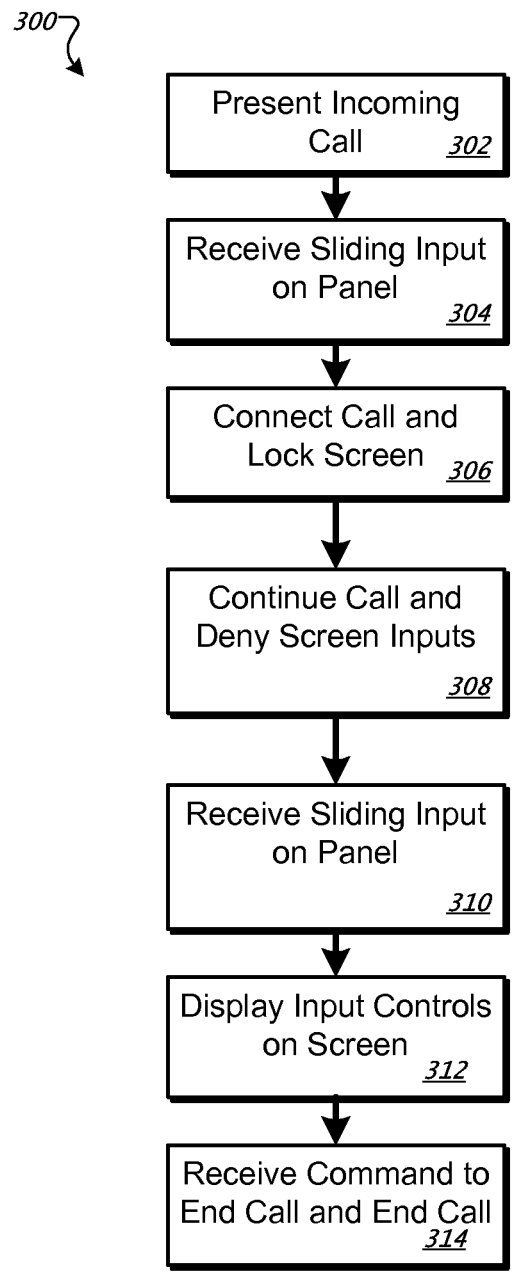
FIGS. 3A-3C are flow charts of example processes for locking input to a touch screen user interface.
Figure 3B:
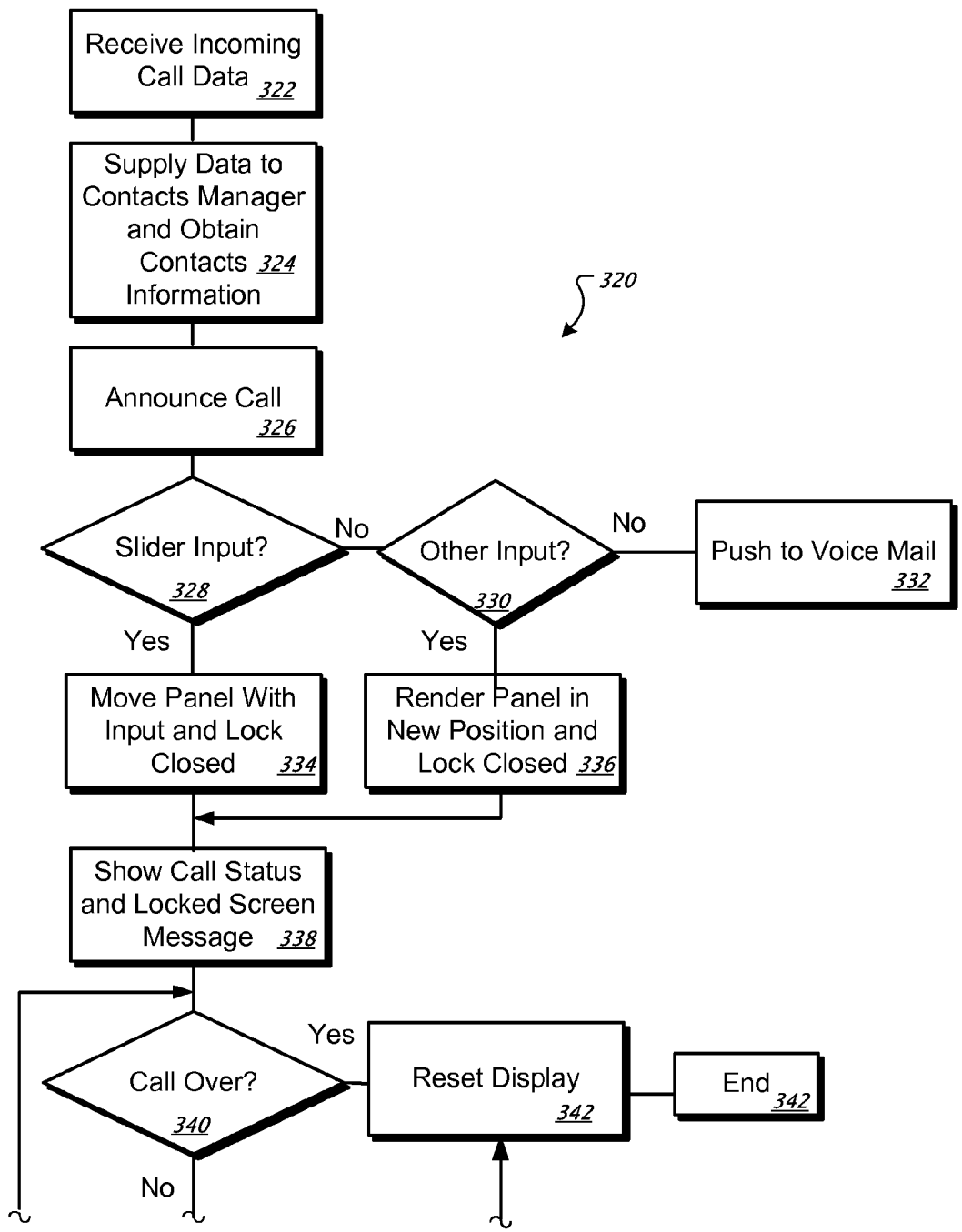
Figure 3C:
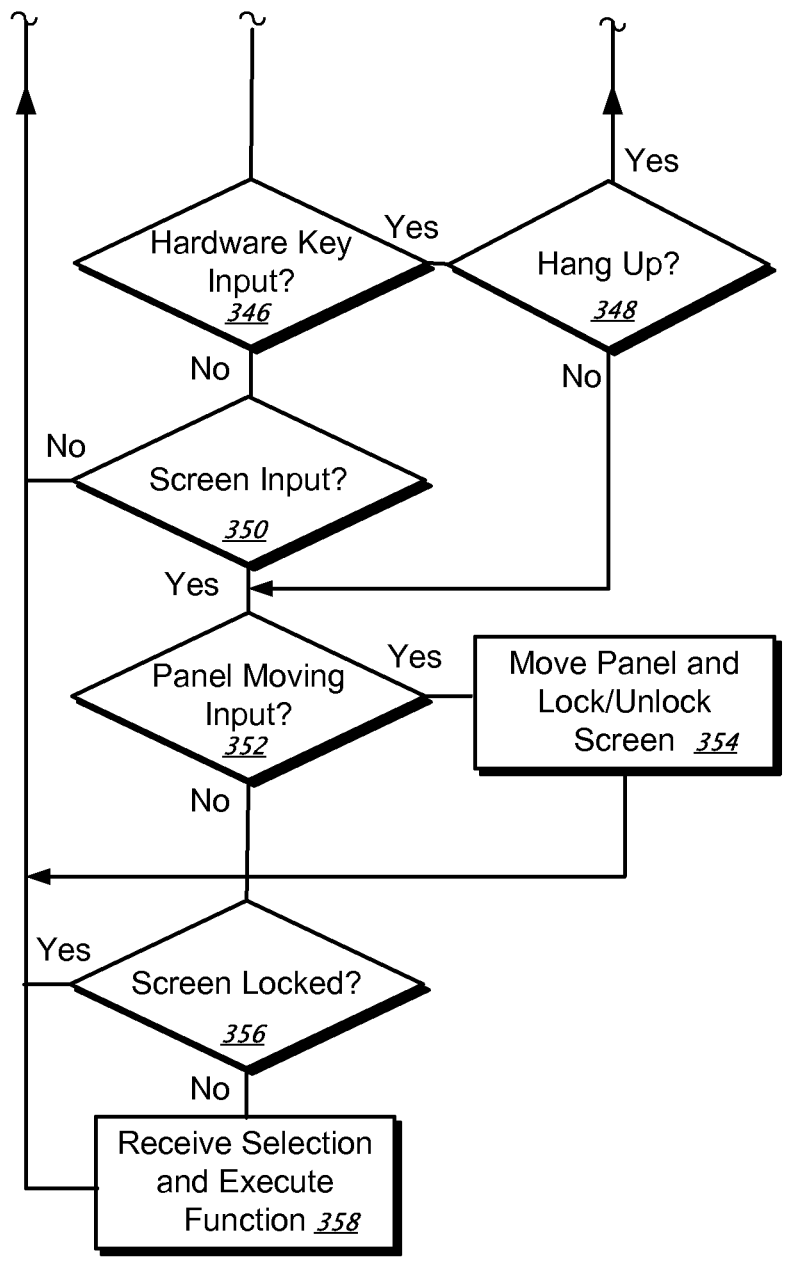

FIGS. 3A-3C are flow charts of example processes for locking input to a touch screen user interface. FIG. 3A generally shows a process 300 by which input mechanisms for a mobile device are locked while a user is taking a telephone call on the device. FIGS. 3B and 3C generally show two portions of a process 320 by which a user interacts with a device during a telephone call to lock and unlock the device from receiving inputs.

Referring now to FIG. 3A, the process 300 begins at box 302, where an incoming call is presented to a user of a mobile device. The call may be initially received via wireless interface and may be provided for handling by a telephony application on the device. The presentation of the incoming call may be made audibly by a common ringing or ring tone of the device, and also visually, such as by presenting a name and image of the caller on the display of the device. Such display may include presenting a representation of a shield, panel, or similar cover on the device, along with an instruction to the user that they are to move the cover in a particular manner to answer the call.

At box 304, the device receives a sliding input on cover. For example, the user may slide a cover that does not fill the entire length of the device display upward from one end of the device display to the other end of the device display. Such input may cause a message to be sent to the telephony application that the call is connected and the user may begin talking to the caller (box 306). The action may also cause an access manager or similar program or module to block input on the display other than inputs that are directed to unlocking the display. As a result, the user may be prevented from accidentally touching the display with their fingers or the side of their face while they use the device and talk on the telephone.

The user may continue to talk on the telephone call while the device is locked from input, and while the device denies the user from making any input to the screen other than a locking a unlocking input, as shown at box 308. During this time, notifications for other events on the device may also be blocked or may be allowed through. For example, arriving electronic mail messages, completion of file downloads, and other similar messages may be provided to the user (e.g., by alerts that appear temporarily on the display). While the user may normally be allowed to interact with such alerts by selecting them on the device, such selection may be disabled when the device is in a locked state. Other more persistent reminders of the alerts during this period may also be added to the display, in the form of selectable controls such as icons added to the status bar of the device, so that the user may select those controls when a call is finished and the device is unlocked again.

At box 310, the device receives a sliding input on the panel or other cover. Such input may occur by a user pressing on the panel and sliding it back to its original position from where it was before the call started. Upon receiving such input, the device may reveal one or more selectable controls in the form of a graphically generated button, that the user may select to provide additional interaction with the device. For example, the controls may permit the user to launch other applications on the device, to see messages that have arrived on the device during the particular telephone call, or to perform various other functions with the device.

After that time, the user may also slide the cover back over these selectable controls to relock the device, and may then unlock the device again by sliding the cover yet again. In certain implementations, the cover may have more than two positions. For example, certain selectable controls may be located on one end of the cover, while other selectable controls may be located on another end of the cover. Sliding the cover in one direction may hide one set of controls and expose the other set of controls, while sliding the cover in the opposite direction may hide and expose the opposite set of controls.

Such interaction with the cover may occur until the call ends, as shown at box 314. The call may end, for example, in familiar manners such as by a caller at the other end of the line terminating the call, with the local device sensing that the call has been terminated, and automatically terminating the call. Alternatively, the call may end by a user of the local device selecting a control to terminate the call. Such a control, for example, may be displayed on a touch screen display and may be pressed by user, or may be implemented by the pressing of a hardware button on the device, among other things.

Referring now to FIG. 3B, there is shown the beginning of a process 320 by which a user interacts with a mobile device in taking a telephone call. At box 322, the device receives incoming call data from a wireless network. The call data may include, for example, a number of a caller placing a call to the device. At box 324, the device supplies such incoming call data to a contact manager and obtains corresponding contact information. For example, the device may submit the telephone number received from the wireless network to a contact manager which may perform a lookup for any people in a contact database having such a telephone number. At box 326, the device announces the incoming call. Such an announcement may involve displaying information from the contact database about the caller, such as a telephone number and image of the caller. Where no such information is available from a contact database, a generic display may be provided.

The device may then continue announcing the call both audibly and visually, until the user provides some form of input to the device. For example, the user may move a slider element such as a cover that is displayed on the graphical display of the device, as instructed by the device, so as to cause the call to be answered. Such selection by the user may cause the device to respond by moving the cover along with the user's selecting of the cover, may cause the call to be completed by the device so that the user may talk to the caller, and may cause the touch screen on the device to be locked from input while the call continues.

The input may also occur from a user selection of some element other than the slider. For example, a hardware button on the device may be programmed so that its selection causes calls to be answered on the device. In such a situation, the cover on the display may be moved automatically into the same position it would take if the user had chosen it and slid it across the display. The call again may be completed and the display may be locked to further input (box 336). In a like manner, certain motions of the device may indicate that the user is lifting the device to their ear so as to answer an incoming call.

Other input may represent still other desires from the user. For example, the user may move the device quickly such as by slapping the device in their pocket or bag, to indicate that they do not want to take the call, but they do want the device to be quiet. Such an action—sensed by an accelerometer in the device—may cause the device to push the call into voicemail (box 332), and the particular form of the input (e.g., one slap or two) or the identity of the caller (e.g., certain callers may be told the line has been disconnected) may be used to control the voicemail message that the caller receives. Other inputs, such as pressing certain hardware buttons, may have a similar effect.

Where the user selection results in the call being completed, a call status screen may be displayed with the identity of the caller and the length of the call, and a message may also be displayed to indicate that the screen has been locked to input and instructing the user what must be done to unlock the screen (box 338). The instructions, for instance, may indicate that the user needs to slide the cover back to its original position by dragging his or her finger across the screen in order to unlock the device.

The device may then wait while the call is ongoing. When the call ends, as indicated by box 340, the display may be reset to the state it occupied before the call came in (box 342), and the process may end (box 343).

Inputs received from the user during the call, and the device's reaction to those inputs, are shown on the continuation of process 320 in FIG. 3C. at box 346, an input is received from the user and is tested to determine whether it is an input from a hardware key. If it is such an input and is from a key assigned for ending a call, box 348 may determine that the call should be ended, and the display may be reset at box 342 with the call ending at box 343. If the input is not a hardware key input, but is instead a screen input, as indicated at box 350, the process 320 may be determine whether the input involves moving of the panel or other cover on the device, at box 352. If the input involves moving of the panel, the display of the panel may be moved on the device and the screen may be locked or unlocked in accordance with the direction that the panel has been moved (box 354). Again, the process 320 may return to waiting for user import at such a point.

Where the input is something other than a hardware key input or a moving of the panel, the device may determine whether the screen is currently locked, at box 356. If the screen is locked, the command may be ignored, and the process 320 may return again to waiting for additional commands from the user. In contrast, if the screen is not locked to the particular sensed input, the device may receive the selection from the user and may execute whatever function is indicated by the selection, as shown by box 358. Again, once the selection has been executed, the process 320 may return to waiting for additional user input.

Figure 4:
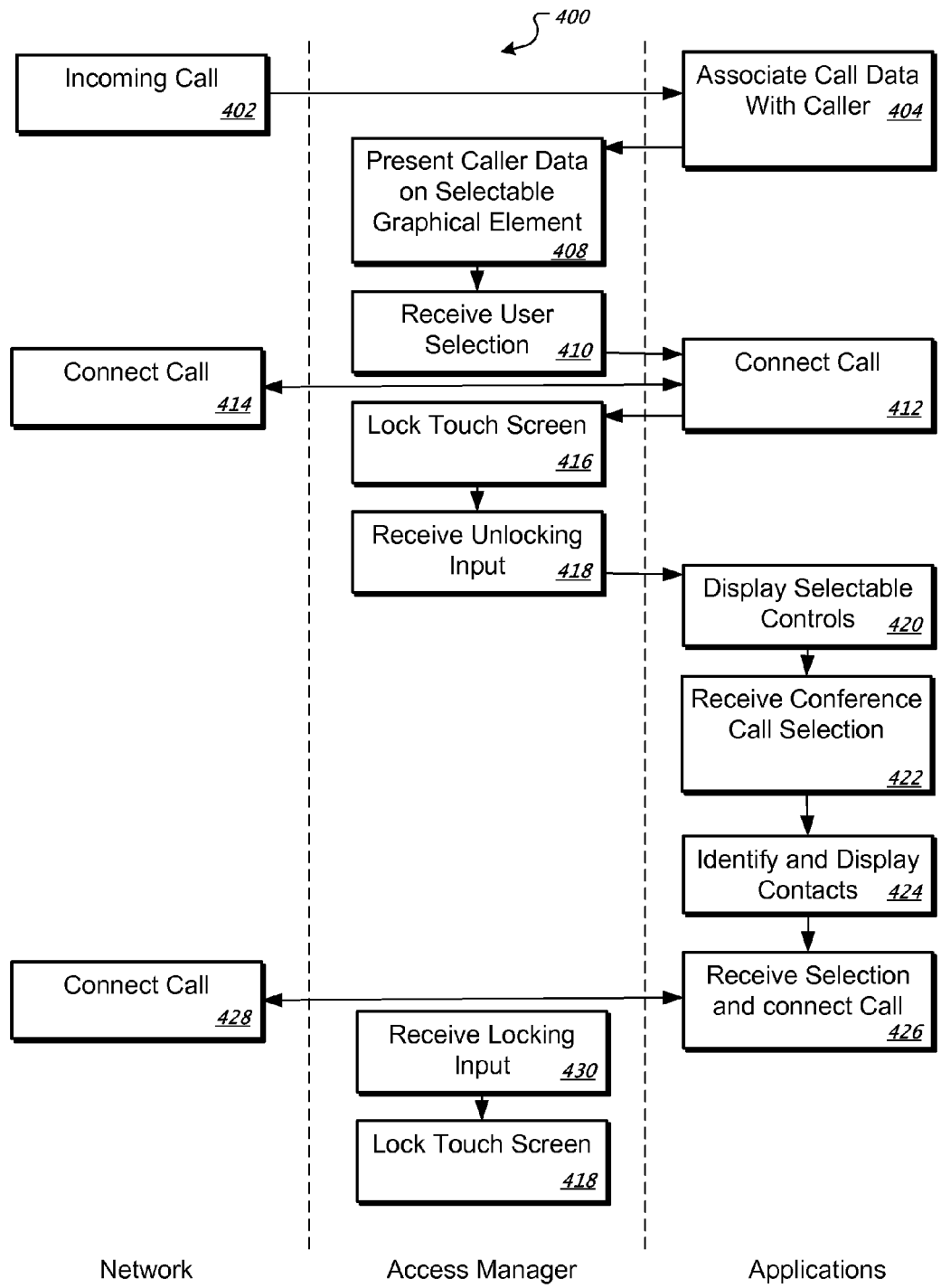
FIG. 4 is a swim lane diagram of an example process for locking user input during a telephone call on a mobile device.

FIG. 4 is a swim lane diagram of an example process for locking user input during a telephone call on a mobile device. In general, the process 400 shows particular actions that may be taken with respect to the managing of a device when a call is being handled, by a wireless network with which the device communicates, by an access manager or similar application or module on the device, and by one or more other applications on the device, as shown by three different lanes in the diagram. The particular actions carried out by each of the three participants are shown here for example only, and it should be understood that various other components may be employed to carry out the actions, and that the particular actions shown here may be supplemented or replaced by different actions and may be carried out by different ones of the components indicated by each lane.

The process 400 begins at box 402 where the network presents an incoming call to a mobile device. An application on the device, such as a telephony application, may be notified about the incoming call and may receive data that is sent from the network. Such data may include, for example, data identifying the device or the caller making the call.

At box 404, the telephony application, perhaps in combination with other applications, associates the received call data with a caller who was identified in a contact database stored on the device or otherwise accessible by the device, such as at a central server system. The association may involve, for example a simple lookup using the data received from the network and comparing such data to records stored in a contact database.

Particular caller data obtained by the telephony application may then be passed to an access manager which may display a graphical element for controlling access to the device, along with the data about the caller, as shown at box 408. Such a display may also invite the user to provide a particular selection to the device, such as to answer the incoming telephone call.

At box 410, the device receives a user selection, which may be a selection that follows provided instructions for answering the call. Such a selection may cause the telephony application to cause the call to be connected, so that the caller may communicate with the user of the mobile device (boxes 412, 414).

The user selection may also cause the access manager to lock the touch screen to further input (box 416) while the call is ongoing. Thus, at this stage of the process 400, the device may wait for further user input while the user talks on the telephone. Such input may occur by a selection on the screen in the form of an unlocking selection, by hardware buttons away from the screen or in an area of the screen is unlikely to be selected accidentally, or by a verbal input from the user. At box 418, the user provides such an unlocking input to the device. For example, the user may slide their finger across the element that they originally slid into place to activate the telephone call.

When such a sliding selection occurs, the element may move out of the way of several selectable controls that were previously covered and hidden by the element (box 420). Such controls may then be readily selected by the user. In this example, one of the controls is a button for instituting a conference call on the device. At box 422, the user selects such a control to institute a conference call, and the system responds by identifying and displaying contacts associated with the user (box 424). The user may then select one of the contacts or separately type a telephone number of another user who they would like to bring into the conference call. Such a selection may occur, for example, by selecting a name in a contact list associated with the user (box 426), and a call may be connected to that additional user as a result (box 428).

The user may then continued talking on the telephone to the other two users and the device may await additional instructions from the first user. At box 430, for example, the user indicates, such as by sliding the element with their finger again, that they would like to lock the device once more. For instance, the user may wish to place the device against their face during the conference call and may wish not to accidentally make any selections during such a process. As a result of such a selection, the process 400 locks the touch screen once again (box 418).

Thus, by this process, various subcomponents within a system may interact to provide a user with access to a touch screen interface that may be locked conveniently so as to prevent accidental selections on the interface. Such locking may occur by manual selection of the user, or by various automated mechanisms. In addition, the user may be allowed to conveniently unlock the input mechanism when they would like to have additional functionality from the device, such as when they are not holding the device to their faith and thus can see the screen of the device and interact with it a more complete manner.

Figure 5:
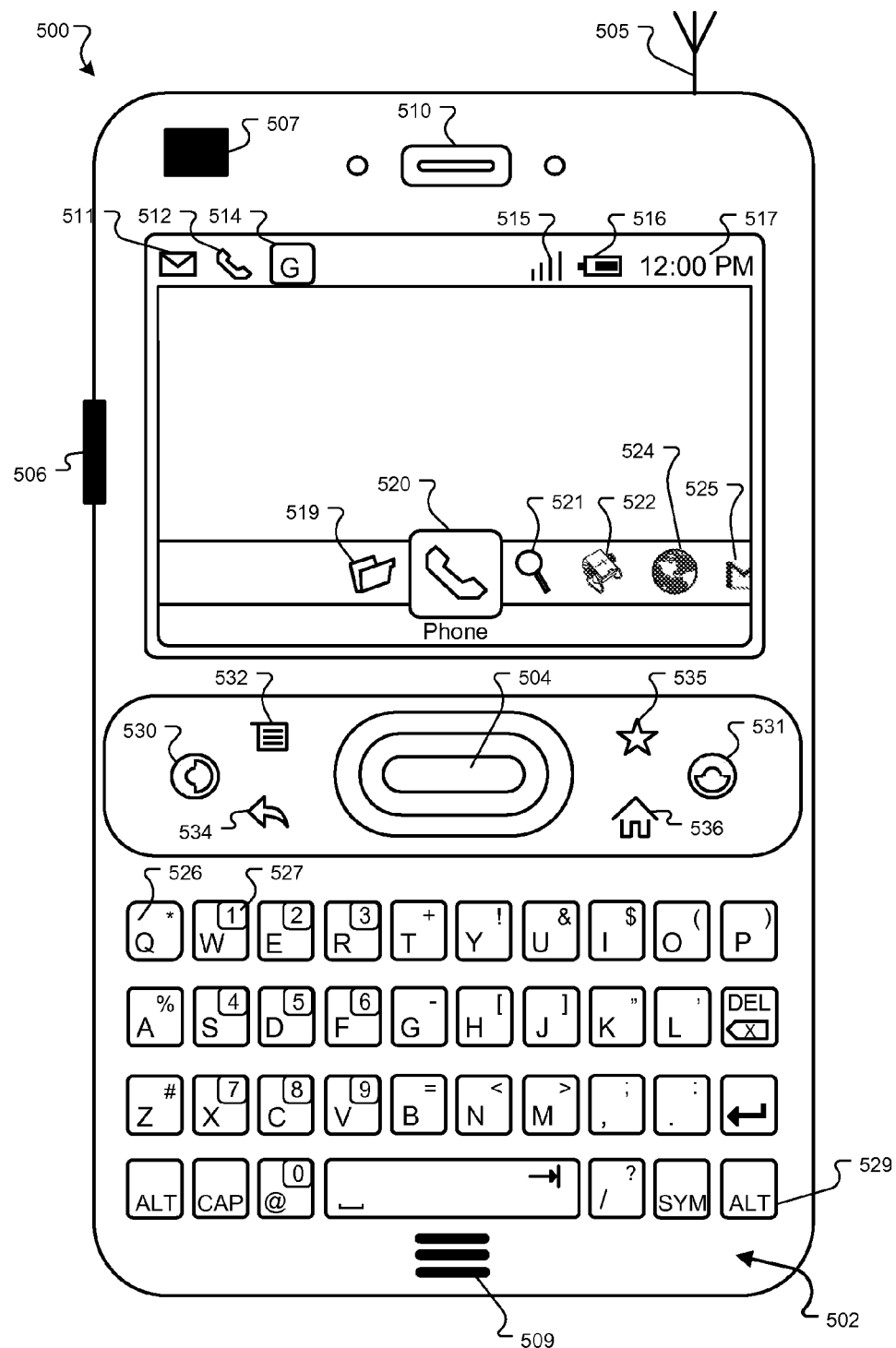
FIG. 5 is a schematic representation of an exemplary mobile device that implements embodiments of the notification techniques described herein.

Referring now to FIG. 5, the exterior appearance of an exemplary device 500 that implements the user interface features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285 transceiver and PM7540power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
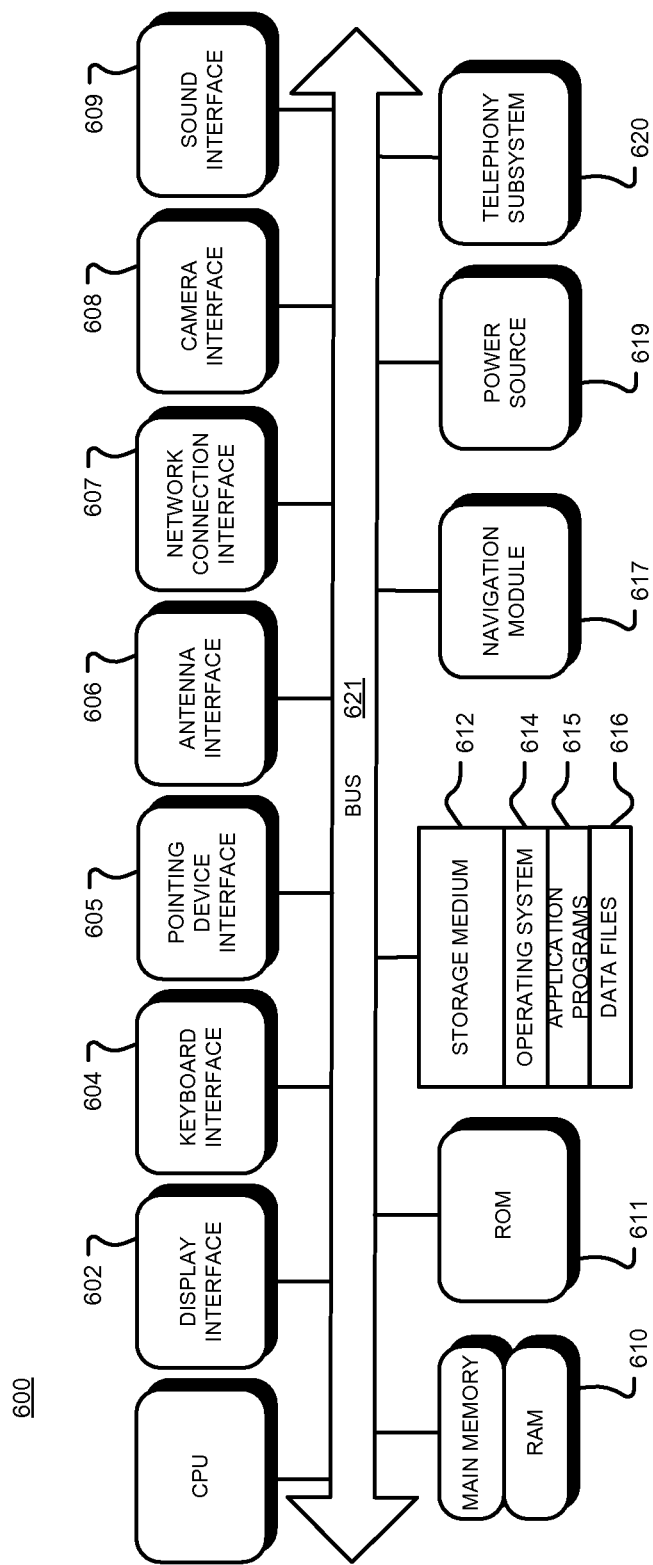
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM.

Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as a mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access an email application, an instant messaging application, a video service application, a mapping application, or an image editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
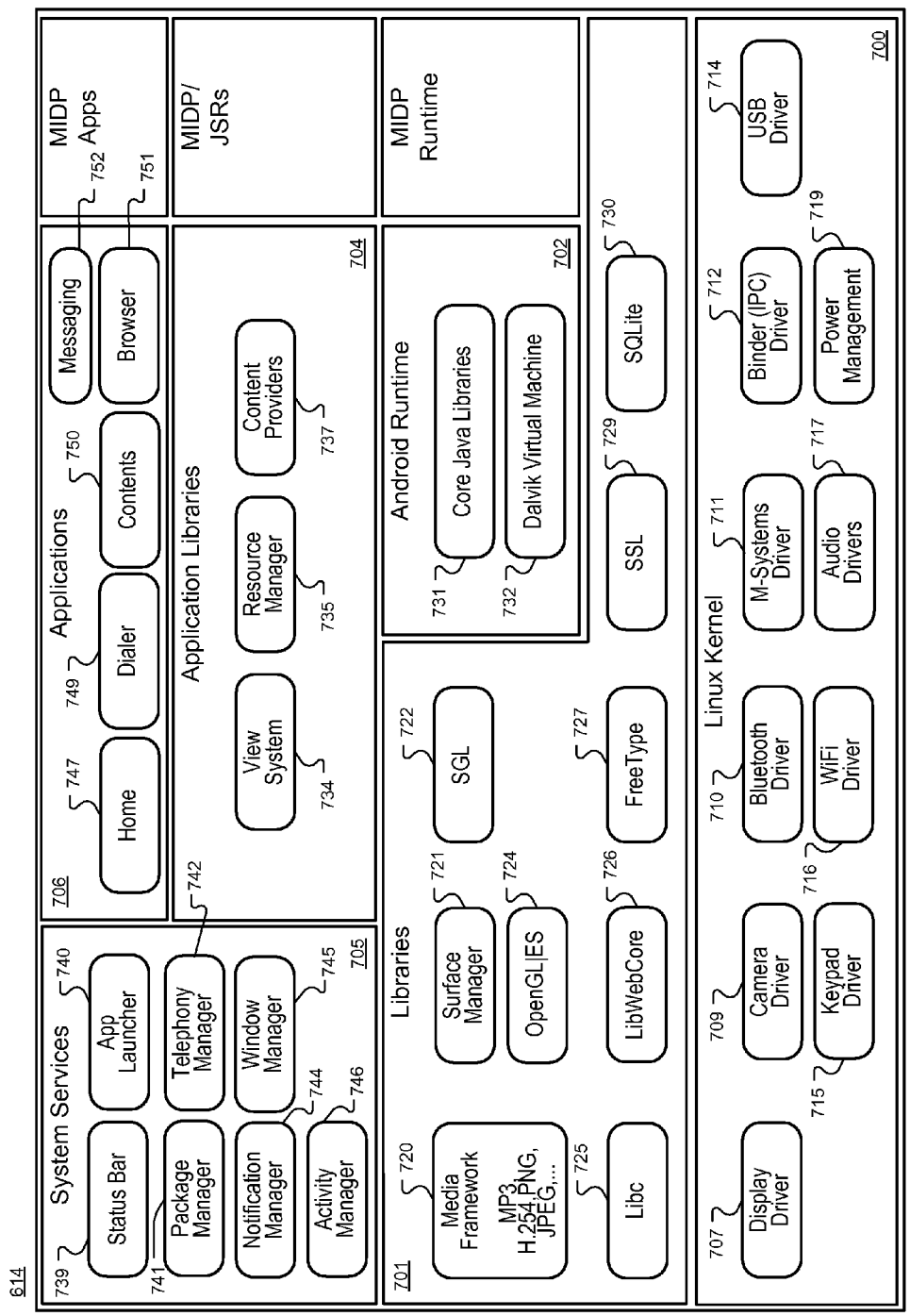
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is a mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated byte-codes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, and a browser application 751. Each of the applications may generate graphical elements that either do or do not have long press interactions. As described above, those that do not have long press interactions may provide no immediate visual feedback when they are first pressed, while those that do have such interactions may be highlighted between the time they are first pressed and the expiration of the long press period. Also, the highlighting may not occur exactly upon a press, so that mere tapping of an item does not cause it to be highlighted; instead, the highlighting may occur upon the expiration of a short press period that is slightly more than the time period for a tap, but appreciably shorter than a long press period.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
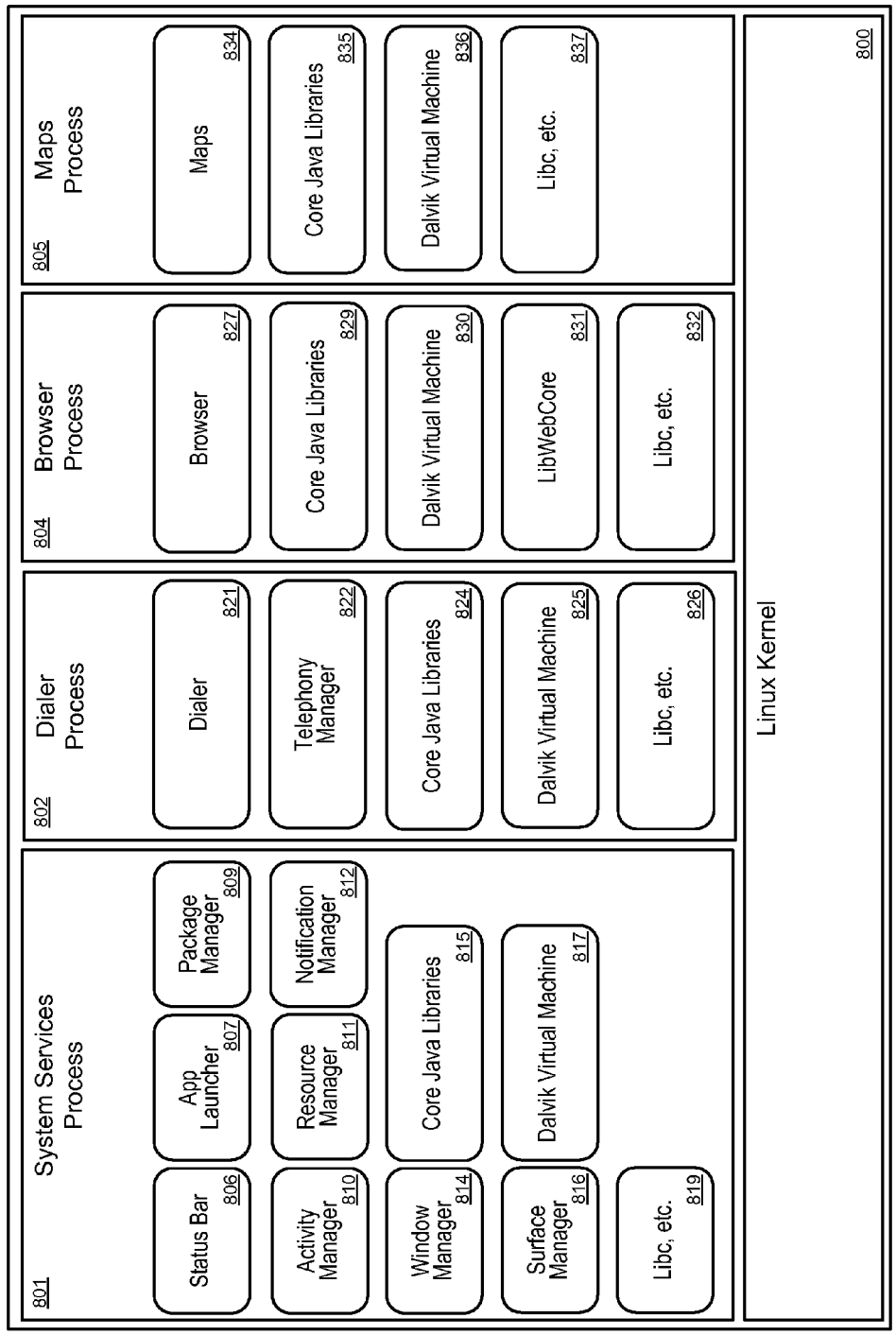
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manger processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
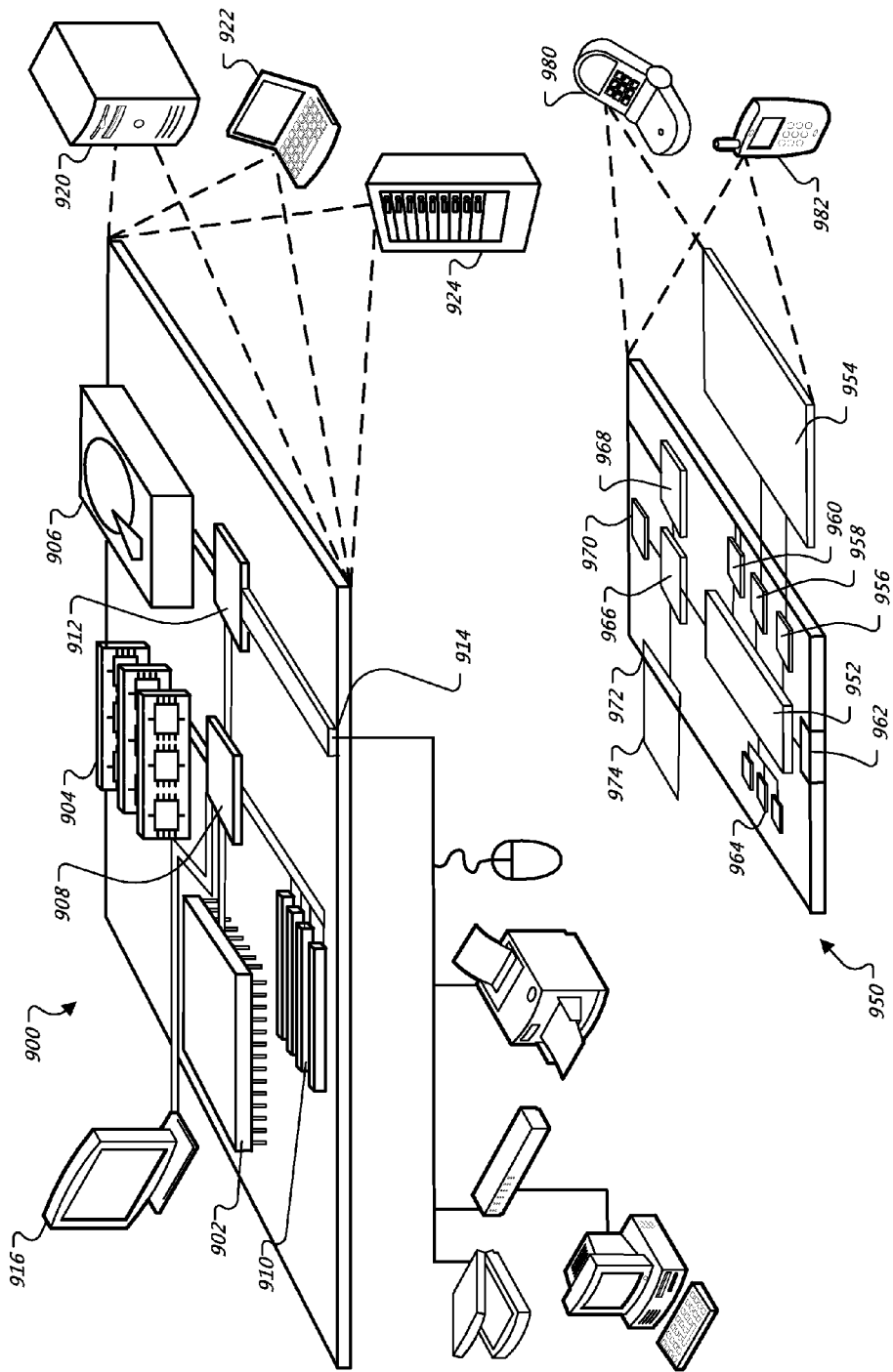
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
  announcing an incoming telephone call and an identity of a caller on a slideable panel that substantially covers a mobile device touch screen display along a first direction;
  receiving a first user selection that comprises an on-screen dragging motion on top of a first location on the mobile device touch screen display at which the slideable panel is displayed, the on-screen dragging motion being along a second direction that is substantially orthogonal to the first direction;
  in response to receiving the first user selection:
  (a) covering, with the slidable panel, a region of the mobile device touch screen display that was not previously covered with the slidable panel,
  (b) connecting to the incoming telephone call,
  (c) locking the mobile device to touch screen inputs by blocking inputs to the touch screen except for a predefined unlocking input, and
  (d) displaying the identity of the caller on the slideable panel on the mobile device touch screen display;
  receiving a second user selection that comprises an on-screen dragging motion along a third direction and on top of a second location on the mobile device touch screen display at which the identity of the caller is displayed on the slideable panel, wherein the third direction is substantially opposite to the second direction; and
  in response to receiving the second user selection:
  (a) displaying one or more selectable controls at a third location of the mobile device touch screen display, the one or more selectable controls including a selectable control to terminate the telephone call, wherein the one or more selectable controls are not displayed in the third location until after the second user selection is received, and
  (b) unlocking the display for selection of the one or more selectable controls.

2. The method of claim 1, wherein the displaying of the one or more selectable controls includes presenting controls that affect the incoming telephone call.

3. A computer-implemented device, comprising:
  a touch screen display;
  a wireless communication interface to receive data for telephone calls for a user of the device; and
  a display manager programmed to:
  announce an incoming telephone call and an identity of a caller on a slideable panel that substantially covers a mobile device touch screen display along a first direction;
  receive a first user selection that comprises an on-screen dragging motion on a first location on the mobile device touch screen display at which the slideable panel is displayed, the on-screen dragging motion being along a second direction that is substantially orthogonal to the first direction;
  in response to receiving the first user selection:
  (a) cover, with the slidable panel, a region of the mobile device touch screen display that was not previously covered with the slidable panel,
  (b) connect to the incoming telephone call,
  (c) locking the mobile device to touch screen inputs by blocking inputs to the touch screen except for a predefined unlocking input, and
  (d) display the identity of the caller on the slideable panel on the mobile device touch screen display;
  receive a second user selection that comprises an on-screen dragging motion along a third direction and on top of a second location on the mobile device touch screen display at which the slideable panel that is displaying the identity of the caller is displayed on the slideable panel, wherein the third direction is substantially opposite to the second direction; and
  in response to receiving the second user selection:
  (a) display one or more selectable controls at a third location of the mobile device touch screen display, the one or more selectable controls including a selectable control to terminate the telephone call, wherein the one or more selectable controls are not displayed in the third location until after the second user selection is received and
  (b) unlock the display for selection of the one or more selectable controls.

4. The device of claim 3, wherein the display manager is further programmed to display the one or more selectable controls to include controls that affect the incoming one of the telephone calls.

5. A non-transitory computer-readable medium storing software comprising instructions executable by one or more computers which, upon such execution, cause the one or more computers to perform operations comprising:
  announcing an incoming telephone call and an identity of a caller on a slideable panel that substantially covers a mobile device touch screen display along a first direction;
  receiving a first user selection that comprises an on-screen dragging motion on top of a first location on the mobile device touch screen display at which the slideable panel is displayed, the on-screen dragging motion being along a second direction that is substantially orthogonal to the first direction;

in response to receiving the first user selection:
(a) covering, with the slidable panel, a region of the mobile device touch screen display that was not previously covered with the slidable panel,
(b) connecting to the incoming telephone call,
(c) locking the mobile device to touch screen inputs by blocking inputs to the touch screen except for a predefined unlocking input, and
(d) displaying the identity of the caller on the slideable panel on the mobile device touch screen display;

receiving a second user selection that comprises an on-screen dragging motion along a third direction and on top of a second location on the mobile device touch screen display at which the identity of the caller is displayed on the slideable panel, wherein the third direction is substantially opposite to the second direction; and in response to receiving the second user selection:
(a) displaying one or more selectable controls at a third location of the the slideable panel, the one or more selectable controls including a selectable control to terminate the telephone call, wherein the one or more selectable controls are not displayed in the third location until after the second user selection is received and
(b) unlocking the display for selection of the one or more selectable controls.

6. The medium of claim 5, further comprising an operation of presenting controls that affect the incoming telephone call during the displaying of the one or more selectable controls.

7. The method of claim 1, further comprising:
receiving, while the display is unlocked for selection of the one or more selectable controls, a third user selection that comprises an on-screen dragging motion on top of the slideable panel that is along the second direction; and
in response to receiving the third user selection:
(a) removing the one or more selectable controls from the slideable panel, and
(b) at least partially locking the mobile device to touch screen inputs.

8. The method of claim 2, wherein the one or more selectable controls includes a control to initiate a conference call.

9. The method of claim 1, wherein the displaying the one or more selectable controls in the region of the mobile device touch screen display comprises displaying the one or more selectable controls in a region of the slideable panel.

10. The device of claim 3, wherein the display manager is further programmed to:
receive, while the display is unlocked for selection of the one or more selectable controls, a third user selection that comprises an on-screen dragging motion on top of the slideable panel that is along the second direction; and
in response to receiving the third user selection:
(a) remove the one or more selectable controls from the slideable panel, and
(b) at least partially lock the mobile device to touch screen inputs.

11. The device of claim 4, wherein the one or more selectable controls includes a control to initiate a conference call.

12. The device of claim 3, wherein the displaying the one or more selectable controls in the region of the mobile device touch screen display comprises displaying the one or more selectable controls in a region of the slideable panel.

13. The medium of claim 5, further comprising the operations of:
receiving, while the display is unlocked for selection of the one or more selectable controls, a third user selection that comprises an on-screen dragging motion on top of the slideable panel that is along the second direction; and
in response to receiving the third user selection:
(a) removing the one or more selectable controls from the slideable panel, and
(b) at least partially locking the mobile device to touch screen inputs.

14. The medium of claim 6, wherein the one or more selectable controls includes a control to initiate a conference call.

15. The medium of claim 5, wherein the displaying the one or more selectable controls in the region of the mobile device touch screen display comprises displaying the one or more selectable controls in a region of the slideable panel.

* * * * *